US005894036A

United States Patent [19]

Tylko

[11] Patent Number: 5,894,036

[45] Date of Patent: Apr. 13, 1999

[54] THREE-DIMENSIONAL PLOTTER

[76] Inventor: Marek K. Tylko, 5409 Fremont Ave. South, Minneapolis, Minn. 55419

[21] Appl. No.: 08/872,414

[22] Filed: Jun. 10, 1997

[51] Int. Cl.$^6$ .......... B32B 31/00

[52] U.S. Cl. .......... 427/279; 118/696; 156/356; 156/244.11; 156/500; 156/578; 264/401; 427/287; 364/468.25; 364/468.26; 364/468.27

[58] Field of Search .......... 156/60, 356, 500, 156/575, 578, 244.11, 244.21; 264/132, 133, 401, 259, 299, 308; 346/140.1; 425/87; 364/468.26, 468.27, 468.25; 427/466, 279, 287; 118/696, 697

[56] References Cited

U.S. PATENT DOCUMENTS

| | | | |
|---|---|---|---|
| 3,968,498 | 7/1976 | Uchiyama | 346/29 |
| 4,961,886 | 10/1990 | Eckstein et al. | 264/236 |
| 5,121,329 | 6/1992 | Crump | 364/468 |
| 5,303,141 | 4/1994 | Batchelder et al. | 156/244.11 |
| 5,512,122 | 4/1996 | Sokyrka | 156/275.5 |

*Primary Examiner*—Jeff H. Aftergut

*Attorney, Agent, or Firm*—Nawrocki, Rooney & Sivertson P.A.

[57] ABSTRACT

A method and apparatus for generating three-dimensional decoration on a substrate. Controlled deposition of the decoration material on the substrate is achieved through formation and manipulation of an ink droplet at the end of a dispensing nozzle. The ink droplet is maintained by coordinating the delivery rate of the ink through the dispensing nozzle with the dispensing nozzle height and velocity. The ink droplet is optimally maintained to provide a controlled wetting of the substrate surface for deposition of a wide variety of inks.

26 Claims, 13 Drawing Sheets

THREE-DIMENSIONAL PLOTTER

BACKGROUND OF THE INVENTION

This invention relates to a method and apparatus for generating three-dimensional decoration on a substrate. More particularly it relates to a method and apparatus for controlling the deposition of a material on a substrate by forming and maintaining an ink droplet at the end of a dispensing nozzle by coordinating the delivery rate of the ink through the dispensing nozzle which the dispensing nozzle position and velocity.

FIELD OF THE INVENTION

Decorative ceramic objects have been in existence for many millennia. These decorative objects demonstrate the same appearance, utility, durability and value as do modern ceramic objects. Not surprisingly, production techniques have not changed significantly over the years. These production techniques include engobe, which is the decoration of a ceramic object by depositing a sufficient quantity of contrasting colored ceramic material to leave a raised decoration. These production techniques also include inlay, which is the opposite of engobe. Inlay is the creation of an impressed design in a ceramic substrate that is filled with contrasting ceramic material. Inlay decoration has been highly desired for many centuries, with examples being Korean Koryu Wear, or Japanese Mishima decoration. These techniques were accomplished by engraving a design in hard clay objects, and then filling the depressions with a contrasting clay slip. Due to the depth of the design in the object, inlay decoration gives the benefit of maintaining a visible design as the surface is worn. This durability has been demonstrated by surviving examples of medieval inlaid (encaustic) tile floors in 13th century European churches. Tiles of this type were manufactured using a mold to impress a soft clay tile. The resulting impression was then filled with a contrasting clay slip. Inlay tiles have been manufactured using a variety of processes, which include molds to define the boundaries of the designs. In 20th Century England, for example, Minton, Hollins & Co. produced encaustic tiles bearing letters and numerals. These products were sold under the name "Indestructible Lettering". These encaustic tiles were very desirable and had a significant use in signage.

Modern ceramic decoration approaches include transfers and four color printing. Although these approaches provide means to create a complex decoration on a number of objects, they are not easily adaptable to the simple manufacture of individualized objects. This is due to the necessity to produce silk screens or lithographic plates for each object being produced. These approaches also do not produce three-dimensional decoration due to the small quantity of ceramic ink applied to the object.

Efficient production of ceramic decorations is desirable for applications such as name signs where quantities as small as one unit may be produced. Ceramic name signs and ceramic mosaics, however, have become increasingly unavailable and very expensive due to the high cost of the skilled labor required for fabrication of this type of ceramic decoration. Alternatively, plastic may be used for production of small quantities of signage. Plastic, however, is not as aesthetically pleasing and lacks the durability of ceramic.

Thus, it is desirable to have an approach for the efficient production of ceramic decoration which bridges the gap between computer graphics and ceramics to provide aesthetically pleasing ceramics at a low cost. A technique is desired for converting computer images into ceramic images of various types, including raised, inlaid and engraved ceramic images. An approach is desired which does not require skilled labor, such as was necessary in the past for fabrication of ceramic decorations. An approach is desired which will allow a non-ceramicist to design an image using conventional computer aided design techniques and render the design as a three-dimensional ceramic decoration. This desired approach would have the ability to produce aesthetically pleasing raised glyphs. This desired approach would meet the size requirement of standard braille and would incorporate pictograms and braille lettering into signage in an efficient manner. This desired approach would also avoid the addition of braille by secondary machining processes, such as engraving, or by the insertion of brass pins in specially drilled holes. Ceramic signs created by this desired approach would be durable and would have stable color, even in outdoor conditions, and would pose no flammability threat. Signage created by this desired approach would meet the requirements of the Americans with Disabilities Act mandating handicapped accessible signage in certain locations. This desired approach would also allow ceramic designs to be reproduced from any suitable computer image, thus not limiting the ceramic decoration to the stock designs or expensive specialized molds used in the past.

SUMMARY OF THE INVENTION

Accordingly, it is an object of the invention to provide a method and apparatus for generating three-dimensional decoration on a substrate. Controlled deposition of the decoration material on the substrate is achieved through formation and manipulation of an ink droplet at the end of a dispensing nozzle. The ink droplet is maintained by coordinating the delivery rate of the ink through the dispensing nozzle with the dispensing nozzle height and velocity. The ink droplet is optimally maintained to provide a controlled wetting of the substrate surface for deposition of a wide variety of inks.

In a preferred embodiment of the present invention, a dispensing nozzle provides for delivery of ink. A control means coupled to the nozzle manipulates an ink droplet formed at the end of the nozzle to control a contact region of the ink droplet on a surface of the substrate to maintain an accurate deposition of the ink on the substrate.

In the preferred embodiment of the present invention, an ink delivery means is coupled to the nozzle for controlling the delivery rate of the ink through the nozzle to an ink droplet. A positioning means is coupled to the nozzle for positioning an end of the nozzle at a deposition height above the substrate and controlling a nozzle velocity and a nozzle direction which is parallel to the surface of the substrate. The delivery rate of the ink in combination with the deposition height and nozzle velocity determine the contact region of the ink droplet on the surface of the substrate. The contact region of the ink droplet on the surface of the substrate defines an effective pen radius, wherein the pen radius is equal to one-half of the width of the contact region of the ink on the surface of the substrate in a direction perpendicular to the nozzle direction.

In the preferred embodiment, the apparatus for generating three-dimensional ink decoration on a substrate further comprises the ink droplet having a predefined contact angle with the substrate. In the preferred embodiment, the contact angle may be larger than 0 degrees and smaller than 180 degrees, but is optimally close to 90 degrees.

In the preferred embodiment, the ink delivery means comprises a controllable pump. The controllable pump is coupled to the nozzle through a flexible tube, wherein the pump is in fluid communication with the nozzle and delivers a continuous flow of the ink through the nozzle. The pump may be a positive displacement pump, such as a stepper motor controlled 10 ml syringe pump. The ink may also be a highly loaded slurry.

In the preferred embodiment, the control means may be a plotter, router or other similar Original Equipment Manufacturer (OEM) positioning device where the device accepts commands to control the delivery rate of the ink through the nozzle and position the end of the nozzle at the deposition height above the substrate, and control the nozzle velocity and nozzle direction. The commands may be software commands when the control means is software controlled.

In an alternative embodiment of the present invention, the nozzle has a height spacing means for supporting the end of the nozzle above the substrate by a height equal to the deposition height. The height spacing means may be a centered 45 degree chisel point, wherein the chisel point has two points to support the nozzle on the substrate and provide for delivery of the ink through the nozzle onto the substrate.

The present invention further includes a method for generating three-dimensional ink decoration on a substrate. A dispensing nozzle for delivery of ink to a droplet is provided. An outline of an area to be filled is calculated. Next a number of boundary paths and a number of interior paths of the outline are calculated to fill the outline. The nozzle is then positioned at a transport height above the substrate to prevent ink accumulated at the end of the nozzle from being deposited on the substrate as the nozzle is moved at a transport velocity across the surface of the substrate. The nozzle is moved at the transport velocity to a point on one of the number of boundary paths. The nozzle is then lowered to the first deposition height. Next ink is provided at the first ink delivery rate so that an ink droplet is formed at the end of the nozzle and contacts the surface of the substrate, where the contact region of the ink droplet on the surface of the substrate defines a first effective pen radius. Next the nozzle is moved at the first nozzle velocity to trace the one of the number of boundary paths, where the ink being provided at the first ink delivery rate while the nozzle is at the first deposition height and moving at the first nozzle velocity stabilizes the ink droplet on the surface of the substrate at the first effective pen radius to provide for an accurate and uniform deposition of the ink on the substrate. The one of the number of boundary paths is traced with a stabilized ink droplet having a first effective pen radius until just before the one of the number of boundary paths is retraced. The method traces each one of the number of boundary paths in similar fashion until no more untraced boundary paths exist. Next the nozzle is positioned at the second deposition height and the ink is provided at the second delivery rate. The nozzle is then moved to a proximate point on an adjacent one of the number of internal paths at a second nozzle velocity where the ink droplet is stabilized at the second effective pen radius to provide for an accurate and uniform deposition of ink on the substrate before the proximate point on the adjacent one of the number of internal paths is reached. The nozzle is moved at the second nozzle velocity to trace the adjacent one of the number of internal paths. The method then traces a next adjacent one of the number of internal paths until all internal paths have been traced. The nozzle is then lifted from the deposition height to the transport height while being simultaneously moved at the transport velocity to a next area to be filled.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
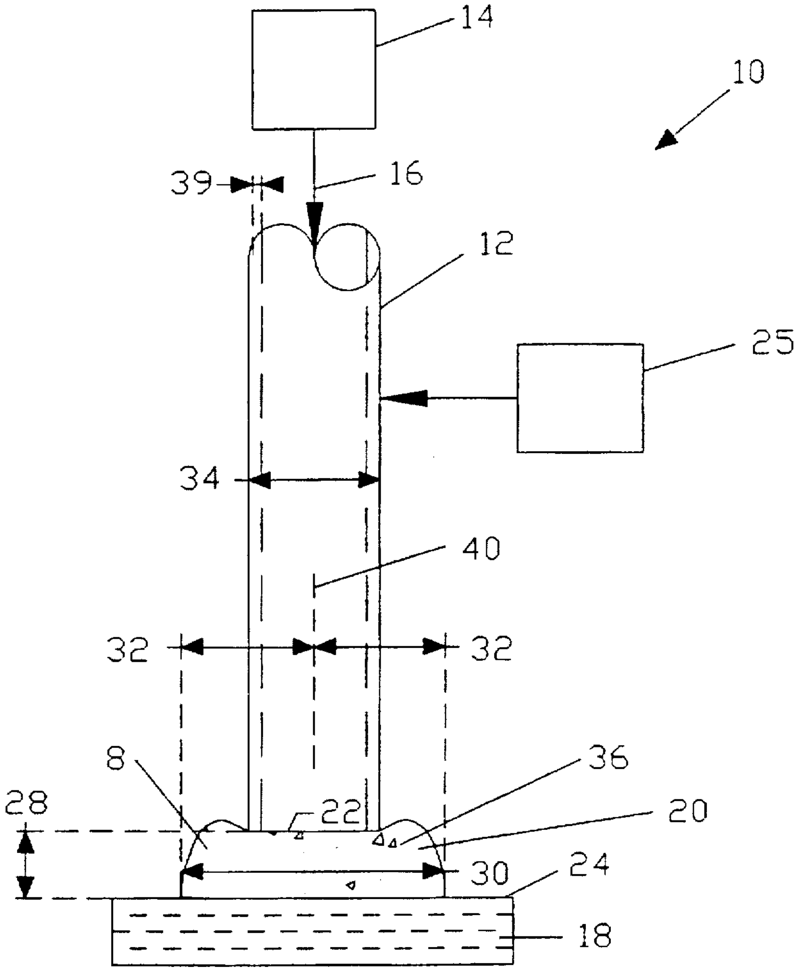
FIG. 1 is a perspective view of the "Three Dimensional Plotter" invention.

Referring now to the drawings, wherein like reference numerals refer to like elements throughout the several views, FIG. 1 is a perspective view of the three-dimensional plotter invention. FIG. 1 shows generally the three-dimensional plotter 10 having a nozzle 12 and a pump 14. Pump 14 is in fluid communication with nozzle 12 through flexible tube 16 and creates three-dimensional ink decorations on a substrate 18. Pump 14, in combination with nozzle 12, pumps ink 8 through nozzle 12 to generate an ink droplet 20 which is formed at an end 22 of nozzle 12. Ink droplet 20 contacts a surface 24 of substrate 18. Pump 14 controls the delivery rate of ink 8 through nozzle 12 into ink droplet 20. A positioning means 25 is coupled to nozzle 12 to position end 22 of nozzle 12 at a deposition height 28 above surface 24 of substrate 18. Positioning means 25 further controls the direction and velocity of nozzle 12 in a direction parallel to surface 24 of substrate 18. Pump 14 controlling the delivery rate of ink 8 into ink droplet 20, in combination with positioning means 25 controlling the deposition height 28 and the nozzle velocity, determine contact region 30 of ink droplet 20 on surface 24 of substrate 18. Nozzle 12 further has axis 40 wherein contact region 30 is centered about axis 40 in a direction perpendicular to the direction of velocity of nozzle 12 and parallel to surface 24 of substrate 18. Ink droplet 20 effects a controlled exchange of ink 8 from nozzle 12 to substrate 18 to maintain an accurate deposition of ink 8 on substrate 18. Contact region 30 defines an effective pen radius 32 which is equal to one half of the width of contact region 30 of ink droplet 20 in a direction perpendicular to the nozzle direction of nozzle velocity.

Ink droplet 20 may be comprised of a highly loaded slurry and may further contain a number of solid particles 36. Inner diameter 34 of nozzle 12 is at least several times larger than the largest dimension of solid particles 36, and is preferably at least five times larger. Pump 14 provides ink 8 through nozzle 12 at pressures less than 400 pounds per square inch. In the preferred embodiment, inner diameter 34 is within a range of 0.01 to 1 inches. In the preferred embodiment, deposition height 28 is equal to half of said inner diameter 34 of nozzle 12. In the preferred embodiment, nozzle 12 may have a wall thickness 39 within a range of 0.005 inches to 0.125 inches. In the preferred embodiment, end 22 of nozzle 12 is flat and is parallel to surface 24 of substrate 18.

In the preferred embodiment of the present invention, pump 14 is a positive displacement pump, which may be a stepper motor driven computer controlled syringe pump. The stepper motor driven computer controlled syringe pump accepts commands to control the delivery rate of the ink through nozzle 12.

In the preferred embodiment, the positioning means 25 may be any number of commercially available plotters, routers or Original Equipment Manufacturer (OEM) positioning devices used to position end 22 of nozzle 12 to deposition height 28 above the surface 24 of substrate 18, and to control the nozzle velocity and nozzle direction. The nozzle positioning means 25 may also vibrate the end of nozzle 12 so as to induce vibrations in the deposited ink, causing a more uniform deposit in the case of inks with high yield points, and to encourage wetting of the surface by inks with high contact angles. Commands to control the ink delivery rate of pump 14 through nozzle 12 and to position end 22 of nozzle 12 to deposition height 28 and to control the nozzle velocity and nozzle direction may be software commands, wherein the plotter is software controlled. The software may control a path for nozzle 12 to follow to fill contiguous like colored areas with a set of contour like paths. The effective pen radius 32 may be varied during the tracing of a path where required, such as in tracing over an isthmus in a glyph, or filling an area with a varying width. The deposition height of nozzle 12 may be varied so as to provide accurate outlines of objects, followed by deposition at an increased height in previously traced areas, such as in braille dots.

It is understood that many different combinations of substrate 18 and ink 8 may be used within the preferred embodiment of the present invention. For example, substrate 18 may be comprised of a glazed stoneware clay fired to cone 6, and may be used with an ink 8 based on a commercial cone 06 mat opaque glaze mixed with the minimum of water necessary for free-flow, and of a color contrasting the substrate glaze, wherein after plotting the combination is fired to cone 06. A substrate 18 comprising a clay dried to a leather hard state may be used in combination with an ink 8 formed by staining a portion of the substrate clay, adding a defloculant, and adding sufficient water to allow free-flow. A substrate 18 formed from an enameled metal sheet may be used in combination with an ink 8 formed by creating an oil base suspension of a commercial metal enamel. A substrate 18 formed from a glass sheet may be used in combination with ink 8 formed by creating an oil based suspension of a commercial glass enamel. A substrate 18 formed as a tile mold may be used in combination with an ink 8 formed from a colored hydraulic cement, where the combination may be formed as an encaustic tile by plotting the image on the substrate 18 and pressing a contrasting hydraulic cement into the mold to form an encaustic tile. The resulting concrete tile may be polished to produce a terrazzo surface. A substrate 18 formed as a tile mold may be used in combination with an ink 8 formed from a stained clay, where the combination may be formed as an encaustic tile by plotting the image on the substrate 18 and pressing a contrasting clay into the mold to form an encaustic tile. A substrate 18 formed from plastic, glass, metal, wood, fabric or ceramic material may be used in combination with an ink 8 which is a contrasting curable resin based ink. A substrate 18 formed from ceramic, glass or metal may be used with an ink 8 which is a ceramic ink. A resist line may be plotted around the proposed exterior of any glyph providing a large contact angle with the ink, preventing egress of the ink from the desired glyph area. A wax emulsion resist line may be plotted around the proposed exterior of any glyph to be plotted in a water based ink.

Figure 2:
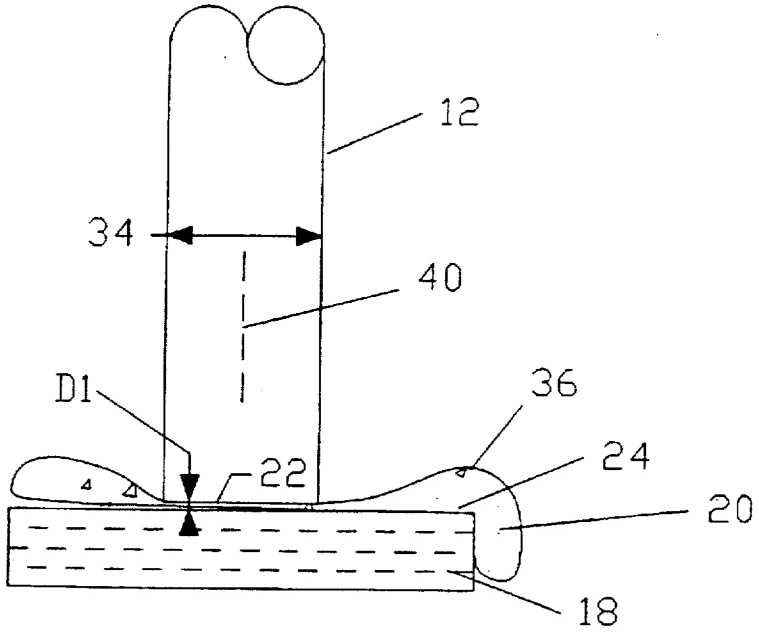
FIG. 2 is a view of the present invention showing loss of edge definition when the nozzle is maintained at an improper deposition height which is too low.

FIG. 2 is a view showing a loss of edge definition when nozzle 12 is maintained at an improper deposition height D1. In the preferred embodiment, the deposition height is of the order of the radius of the tube of the nozzle. In the view shown in FIG. 2, the deposition height is too low, and the ink has a tendency to squirt out under end 22 of nozzle 12, resulting in poor edge definition and reduced resolution. In addition, if end 22 of nozzle 12 contacts surface 24 of substrate 18, ink flow may be blocked, thus creating contact regions of surface 24, wherein the delivery rate of the ink is too low to allow proper deposition.

Figure 3:
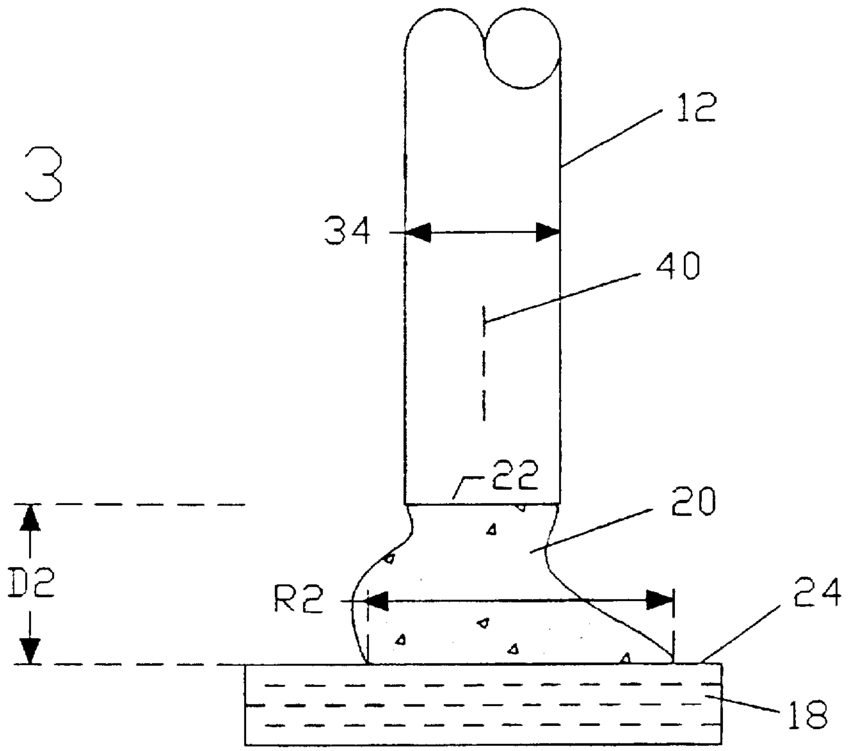
FIG. 3 is a view of present invention showing loss of edge definition when the nozzle is maintained at an improper deposition height which is too high.

FIG. 3 is a view showing loss of edge definition when the nozzle 12 is maintained at an improper deposition height, which is too high. FIG. 3 shows nozzle 12 above surface 24 of substrate 18 at a height D2 which is greater than deposition height 28. In the preferred embodiment, a deposition height is of the order of the radius of the tube of the nozzle. If height D2 is greater than the preferred height, ink may tend to flow off of end 22 of nozzle 12 in an uneven fashion resulting in loss of control of the contact region R2 where ink droplet 20 contacts surface 24. In the preferred embodiment, contact region 30 is centered about axis 40 in a direction perpendicular to the direction of velocity of nozzle 12 and parallel to surface 24 of substrate 18 (see, FIG. 1). Contact region R2, however, may not be centered about axis 40 in a direction perpendicular to the direction of travel of nozzle 12 and parallel to surface 24 of substrate 18, resulting in the loss of control and thus loss of edge definition.

Figure 4:
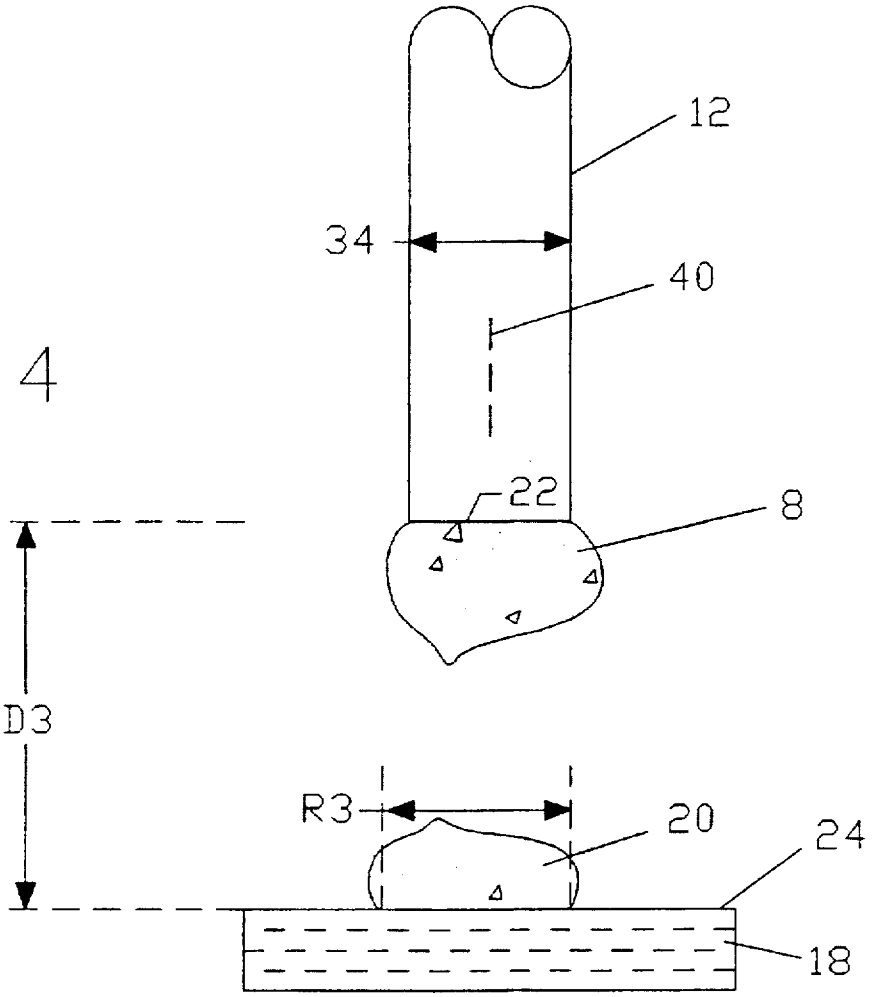
FIG. 4 is a view of present invention showing loss of edge definition when the nozzle is maintained at an improper deposition height which is too high for the ink droplet to maintain a contact region at the surface of the substrate.

FIG. 4 is a view showing loss of edge definition when the nozzle is maintained at an improper deposition height, which is too high for the ink droplet to form a controlled contact region at surface 24 of substrate 18. Nozzle 12 must be small enough to allow sufficient resolution yet allow ink 8 to pass. In the preferred embodiment, deposition height 28 is of the order of the radius of nozzle 12. If the deposition height is too high, the ink 8 may drip and not form a continuous stream from end 22 of nozzle 12 to maintain ink droplet 20 on surface 24 of substrate 18, thus creating a lack of edge definition. If height D3 is much greater than deposition height 28 of the preferred embodiment, ink 8 may drip and form an insufficient and uncontrolled contact region R3 on surface 24 of substrate 18. The result may be a nonuniform fill on surface 24 of substrate 18.

Figure 5:
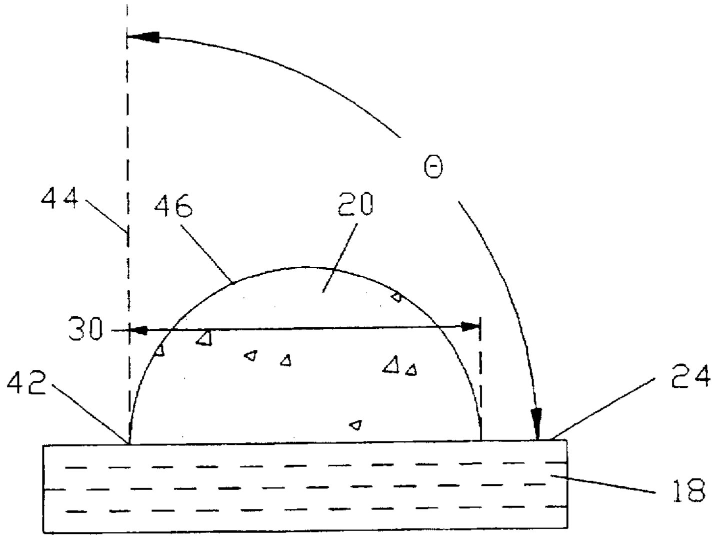
FIG. 5 is a view showing the ink droplet contact angle of the preferred embodiment.

FIG. 5 is a detailed view showing the ink droplet contact angle of the preferred embodiment. In the preferred embodiment, a controlled deposition of material, at acceptable rates, is achieved by the formation and subsequent manipulation of ink droplet 20 at the end 22 of dispensing nozzle 12. Ink droplet 20 is used as a variable radius pen, enabling detailed edges of an area to be filled to be defined with sufficient clarity and the interior areas to be filled at high speed. The control of the ink droplet 20 relative to the surface 24 allows accurate deposition of a wide range of materials., This control is due to the nature of solid wetting by liquids. The contact angle is due to the relative interfacial energies between the solid substrate, liquid ink, and the atmosphere. The contact angle is defined by the following equation: cosine theta ($\text{gamma}_{liquid-vapor}$)= $\text{gamma}_{solid-vapor}-\text{gamma}_{solid-liquid}$. Theta is the contact angle and $\text{gamma}_{x-y}$ is the interfacial energy between phase x and phase y. Due to surface irregularities and persistent reactions such as adsorption of ink 8 onto surface 24, there is a difference in the advancing contact angle of ink droplet 20 measured at a point where the surface is just being wetted, and the retreating contact angle as measured at a previously wetted boundary of the deposited ink. The leading edge contact angle tends to be higher than the previous edge contact angle inferring a tendency of surfaces to remain wetted. As the technique of the present invention is carried out, the proximity of nozzle 12 to surface 24 and ink droplet 20 contacting surface 24 forces a controlled wetting and consequent permanent deposition of ink 8 within contact region 30 of substrate 18 (see FIG. 1).

The contact angle theta is measured relative to ink droplet 20 at measurement point 42 of ink droplet 20. Tangent 44 is a tangent to the surface 46 of ink droplet 20 which is exposed to the air at measurement point 42 as surface 46 of ink droplet 20 contacts surface 24 of substrate 18. The contact angle or theta is measured between tangent 44 and the plane of surface 24 of substrate 18. The contact angle theta is 90 degrees in the preferred embodiment of the present invention.

Figure 6:
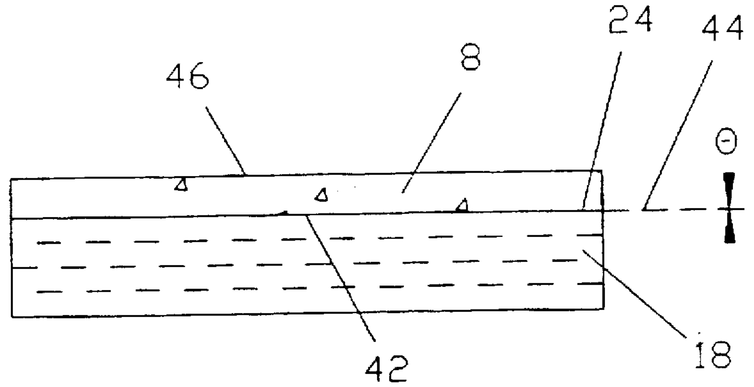
FIG. 6 is a view showing an ink droplet contact angle which is too small for the preferred embodiment.

FIG. 6 is a view showing an ink droplet contact angle which is too small for the preferred embodiment. In FIG. 6, ink droplet 20 has not been formed as ink 8 has spread out thus wetting the entire surface. This is due to the contact angle between the solid surface 24 of substrate 18 and ink 8 being 0 degrees. When the contact angle is too small, a loss of edge resolution and definition of ink 8 on surface 24 of substrate 18 can result.

Figure 7:
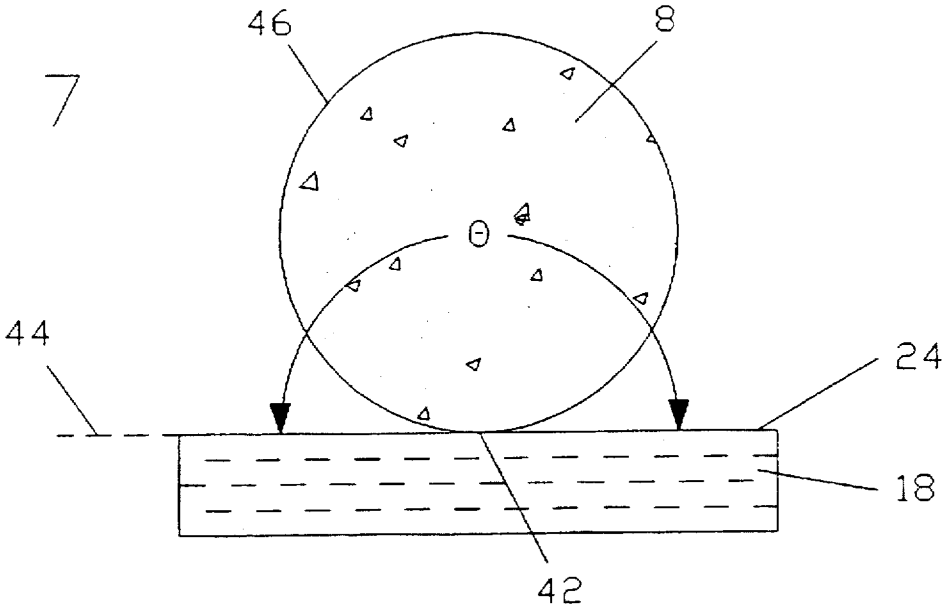
FIG. 7 is a view showing an ink droplet contact angle which is too large for the preferred embodiment.

FIG. 7 is a view showing an ink droplet contact angle which is too large for the preferred embodiment. In FIG. 7, the contact angle theta is equal to 180 since ink 8 has not conformed to ink droplet 20 but rather has conformed to a ball and is not wetting surface 24 of substrate 18. If the contact angle theta is too high, an insufficient contact region of contact of ink 8 with surface 24 of substrate 18 may result, thus resulting in a lack of adequate filling of a desired area to be filled. In reference to FIGS. 5–7, in the case of inks that require thermal curing, the ink may revert to a liquid state, such as glazes or enamels. While in a liquid state, the possibility of spreading occurs as the contact angle theta may change with a changed liquid component in the system. This problem may be abated through the use of several techniques, including limitation of the firing temperature and higher viscosities and yield points resulting from additives in the ceramic system. Engobes typically remain as a bulk solid during firing, although internally grains will be wetted and bonded together by liquid phase components. Hydraulic cements will behave in much the same way as engobes, though not being fired.

Figure 8:
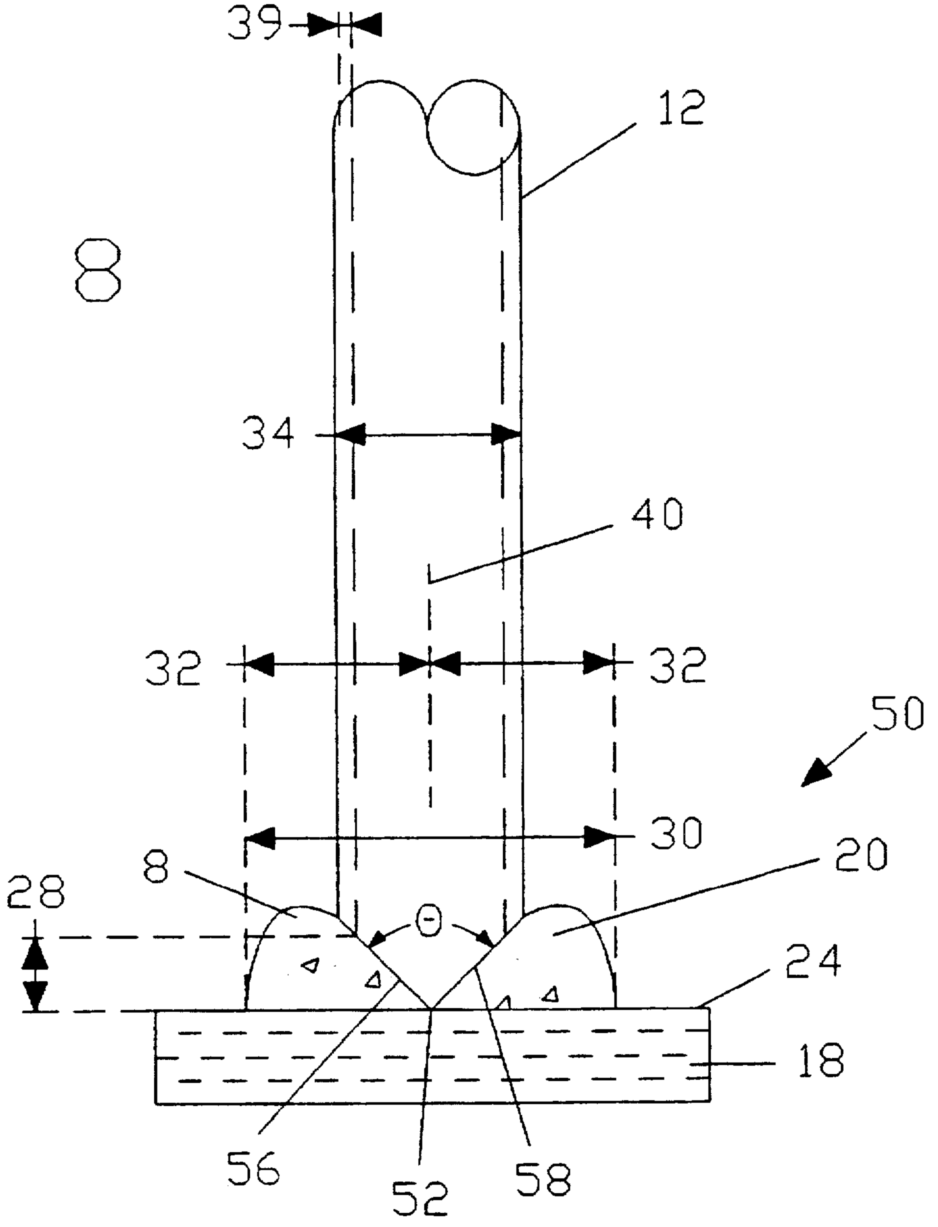
FIG. 8 is a perspective view of an alternative embodiment of the present invention.

FIG. 8 is a perspective view of an alternative embodiment of the present invention. Nozzle 12 has a centered 45 degree chisel point shown generally at 50 having two points 52 and 54 to support nozzle 12 on surface 24 of substrate 18 (see also, FIG. 9). Chisel point 50 has an angle of 45 degrees between end 56 and end 58. Point 52 and point 54 provide for delivery of ink 8 onto surface 24 of substrate 18 through ends 56 and 58 at deposition height 28.

Figure 9:
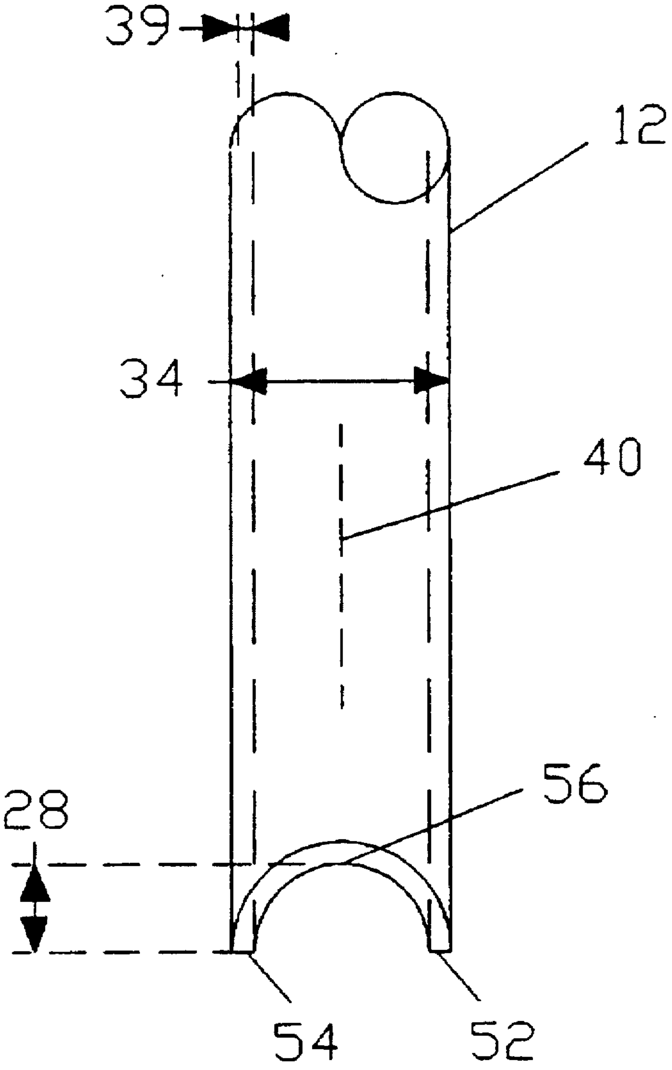
FIG. 9 is a rotated detail view of the alternative embodiment of FIG. 8.

FIG. 9 is a rotated detailed view of the alternative embodiment shown in FIG. 8. FIG. 9 shows nozzle 12 having a centered 45 degree chisel point, wherein deposition height 28 is provided by chisel points 52 and 54. It is understood that nozzle 12 having one or more chisel points may provide yet other alternative embodiments of the present invention.

Figure 10:
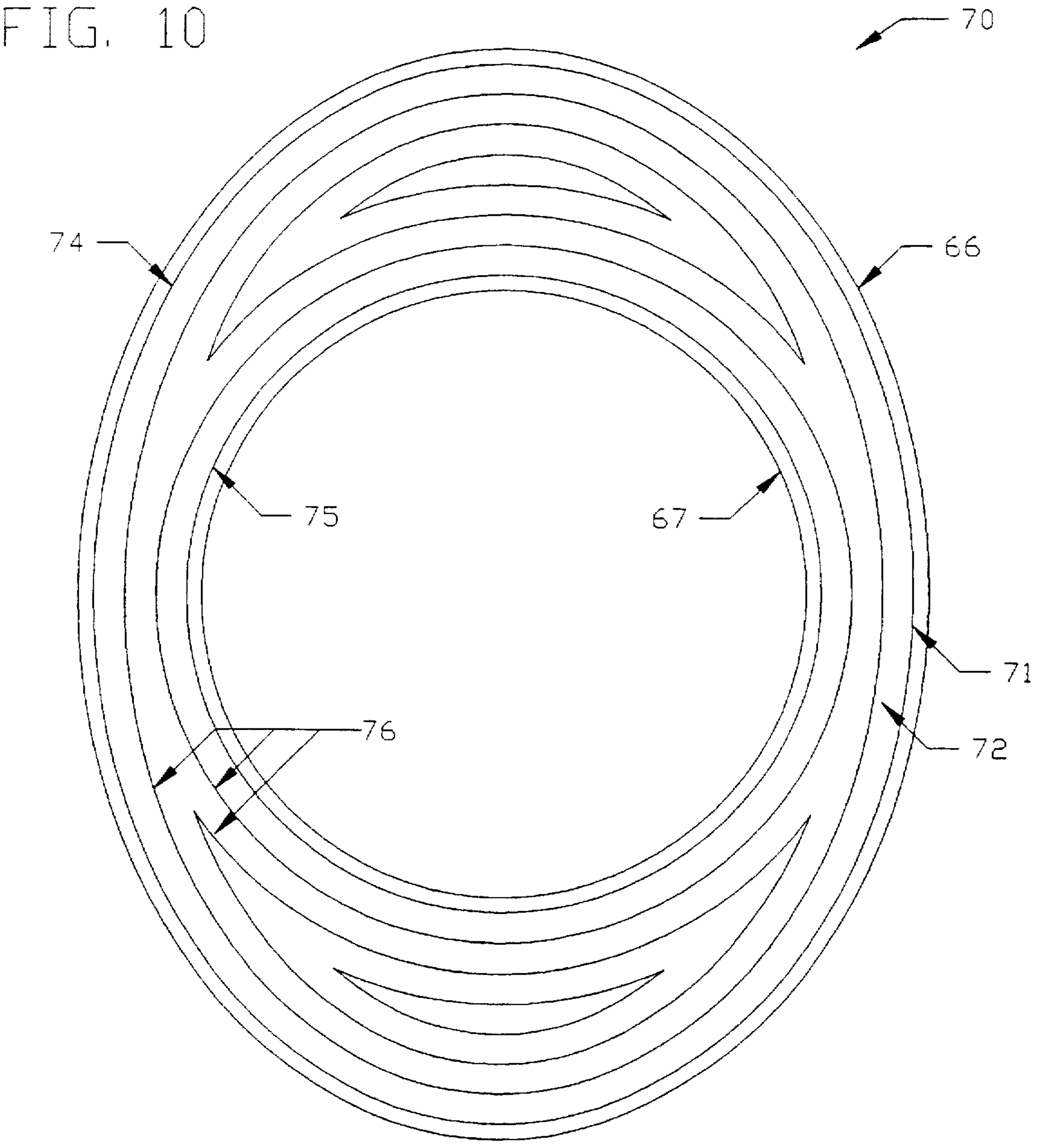
FIG. 10 is a view showing a glyph outline.

FIG. 10 is a view showing a decoration in the form of a font outline of the character "O" and the path of nozzle 12, used to deposit a three dimensional image or glyph on substrate 18. The font outline for the character "O" is shown generally at 70 and illustrates the preferred method of the present invention (see also, FIG. 11). The font outline 70 has a first contact point 72 which is the first contact point within font outline 70 by nozzle 12 when traveling from outside font outline 70 to a point inside the area of font outline 70 which is desired to be filled. Landing inside the area to be filled prevents a loss of edge definition resulting from a spreading of excess ink 8 carried on end 22 of nozzle 12 as the nozzle is lowered from a transport height to a first deposition height. In the preferred embodiment the transport height is greater than the first deposition height. Although the first deposition height may be on the order of deposition height 28, in the preferred embodiment a plurality of deposition heights may be utilized, depending on the delivery rate of ink 8, the velocity of nozzle 12, and the desired effective pen radius (see also, FIG. 1). When nozzle 12 is at the transport height, the ink delivery rate is equal to zero. After lowering nozzle 12 from the transport height to the first deposition height at contact point 72, ink droplet 20 is formed and stabilized at a first nozzle velocity and first ink delivery rate before nozzle 12 reaches first boundary point 71 on external boundary path 74. Nozzle 12 traces external boundary path 74 with ink droplet 20 at the first effective pen radius until a point on external boundary path 74 just before first boundary path 74 is retraced. External boundary path 74 is positioned so as to cause contact region 30 of ink droplet 20 to accurately inscribe external outline 66. The distance between external outline 66 and external boundary path 74 will typically be the first effective pen radius of ink droplet 20. The distance between internal outlines 67 and internal boundary paths 75 will typically be the first effective pen radius of ink droplet 20. Ink droplet 20 being provided from nozzle 12 to surface 24 of substrate 18 at the first delivery rate, and nozzle 12 being at the first deposition height and moving at the first nozzle velocity, in combination determine the first effective pen radius and the desired resolution for the outline of glyph outline 70.

Once first external boundary path 74 is traced, nozzle 12 lifts from the first deposition height to the transport height, and, while moving over areas within the glyph at the transport height so as to avoid splashing areas with unwanted ink, nozzle 12 moves towards any untraced interior boundary paths 75 and traces them with the same method as with external boundary path 74. Once all internal boundary paths 75 have been traced, nozzle 12 lifts from the first deposition height to the second deposition height and moves towards a proximate point on an adjacent internal path 76 located on surface 24 of substrate 18. Internal paths 76 are positioned so as to cause contact region 30 of ink droplet 20 to overlap previously deposited ink, providing a contiguous fill in of the glyph 70. The distance between previously deposited ink and the next internal path 76 will typically be the effective pen radius of ink droplet 20 minus the overlap. Thus the difference between internal paths 76 and adjacent external boundary path 74 or adjacent internal boundary paths 75 is the sum of the first effective pen radius and the second effective pen radius minus an overlap of the first effective pen radius and the second effective pen radius.

The first effective pen radius is equal to half of the width of the contact region of ink droplet 20 on surface 24 of substrate 18 in the direction perpendicular to the nozzle direction and parallel to surface 24 when ink 8 is being delivered to ink droplet 20 at the first delivery rate and nozzle 12 is moving in the nozzle direction at the first velocity. The second effective pen radius is equal to half of the width of the contact region of ink droplet 20 on surface 24 of substrate 18 in the direction perpendicular to the nozzle direction and parallel to surface 24 when ink 8 is being delivered to ink droplet 20 at the second delivery rate and nozzle 12 is moving in the nozzle direction at the second velocity. Each one of internal paths 76 is spaced from adjacent ones of internal paths 76 by twice the second effective pen radius minus the overlap.

Ink droplet 20 is maintained between nozzle 12 and surface 24 of substrate 18 at a second delivery rate, and nozzle 12 moves at a second nozzle velocity and second deposition height 26, the combination determining the second effective pen radius which is optimized to both give the desired resolution for the fill in of glyph 70 and to provide for a rapid fill in of glyph 70. In the preferred embodiment the second effective pen radius is greater than the first effective pen radius. In addition, the second ink delivery rate is greater than the first ink delivery rate, the second deposition height is greater than the first deposition height, and the second nozzle velocity is greater than the first nozzle velocity. Thus, nozzle 12 traces the current internal path 76 at the second effective pen radius. If nozzle 12 while tracing any internal path 76 is adjacent to a path that has not had any portion traced, then nozzle 12 moves to a proximate point on the untraced path and commences tracing it. Just before the return of nozzle 12 to that proximate point, nozzle 12 returns to the partially traced path and continues tracing it. This process is repeated as necessary until all partially traced paths are fully traced. Untraced adjacent internal paths 76 are traced while extant. When no untraced adjacent internal paths 76 remain, but other non-adjacent and untraced internal paths 76 remain, nozzle 12 lifts from the second deposition height to the transport height, and moves to an extant untraced internal path, tracing it with the same method used to trace previous internal paths 76. With the preferred method, nozzle 12 continually moves inward within the area to be filled until all filling in the area is complete. When transferring between adjacent paths, nozzle 12 may be moved between appropriate deposition heights without the intermediate step of raising nozzle 12 to the transport height. While nozzle 12 is being moved between paths, a transport velocity greater than the deposition velocities may be used.

Figure 11A:
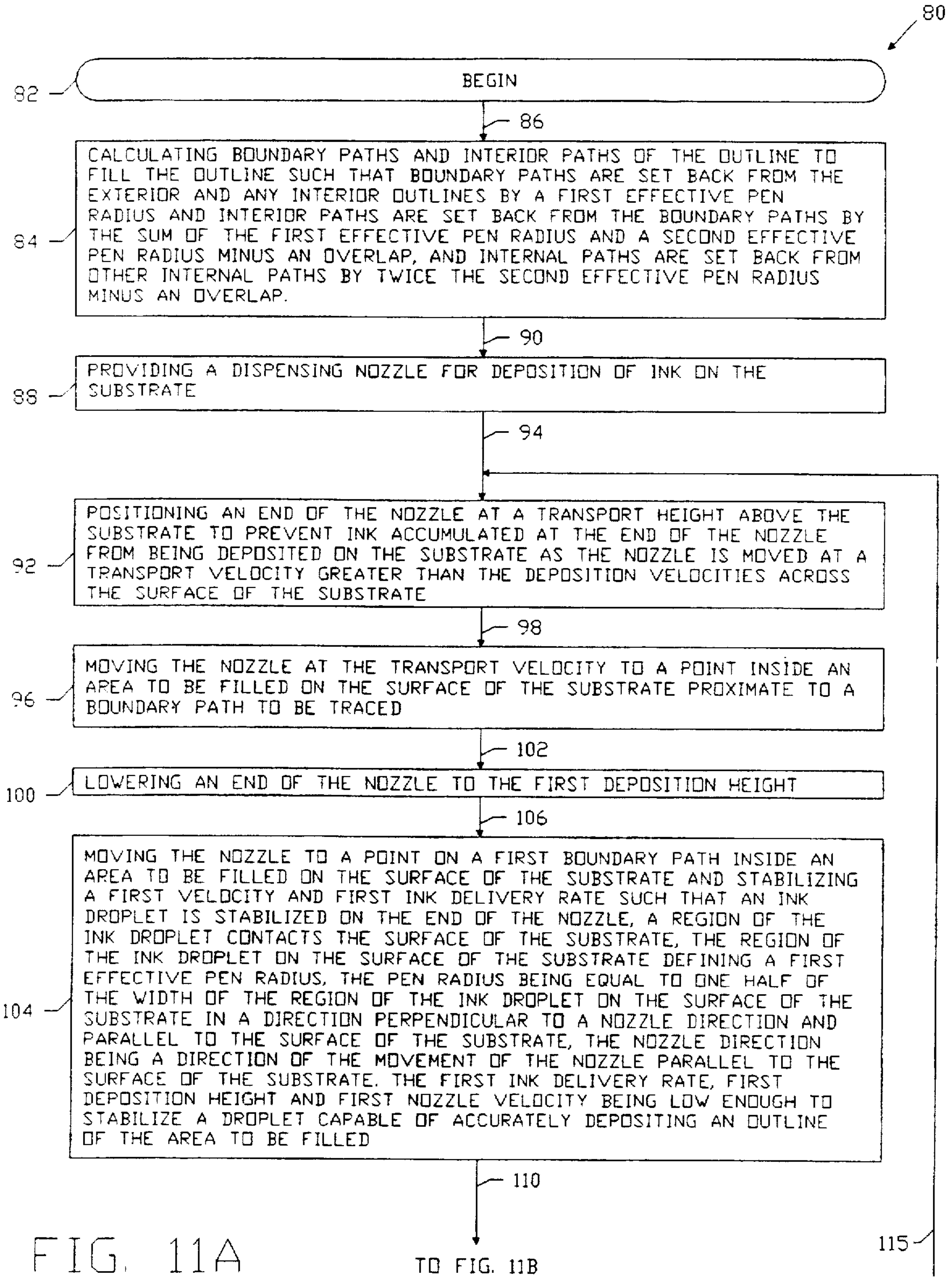
FIGS. 11A, 11B and 11C is a flow diagram showing a preferred method of the present invention.
Figure 11B:
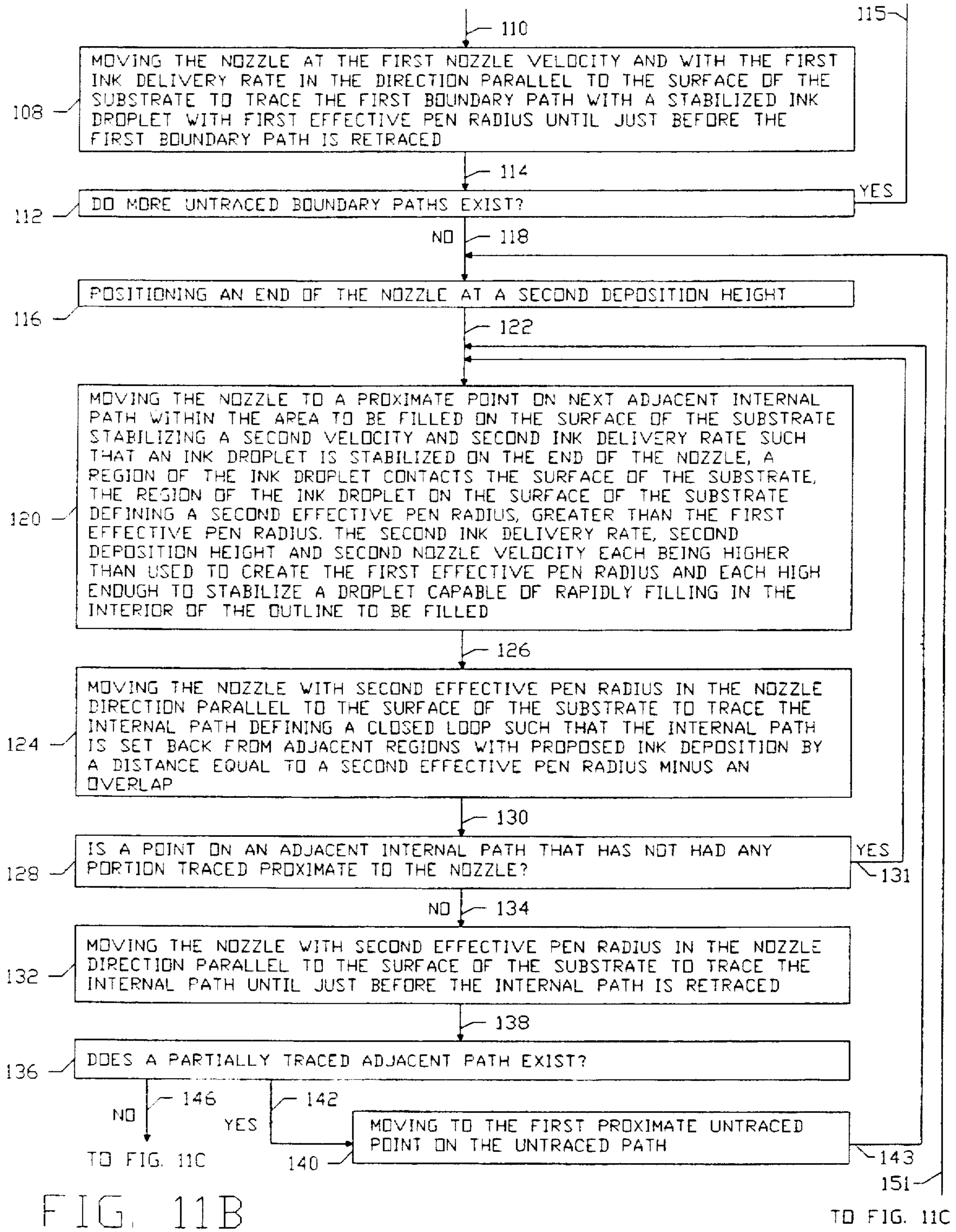
Figure 11C:
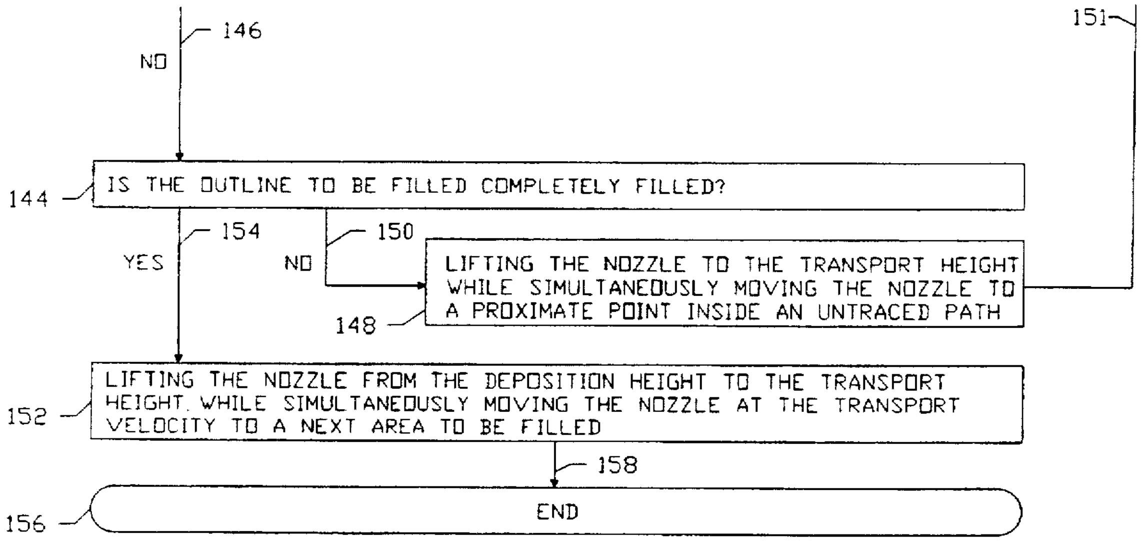

FIGS. 11A, 11B and 11C is a flow diagram showing a preferred method of the present invention. The diagram is shown generally at 80. The flow diagram is entered at element 82, wherein control is passed to element 84 via path 86. Element 84 calculates boundary paths and interior paths of the outline of the area to be filled such that the boundary paths are set back from the exterior and any interior outlines by a first effective pen radius and interior paths are set back from the boundary paths by the sum of the first effective pen radius and a second effective pen radius minus an overlap, and internal paths are set back from other internal paths by twice the second effective pen radius minus an overlap. Control is then passed to element 88 via path 90. Element 88 provides a dispensing nozzle for delivery of ink 8 to an ink droplet 20 where the ink droplet 20 is in contact with the substrate. Control is then passed to element 92 via path 94. Element 92 positions an end of nozzle 12 at a transport height above the substrate to prevent ink accumulated at the end of the nozzle from being deposited on the substrate as the nozzle is moved at a transport velocity greater than the deposition velocities across the surface of the substrate. Control is then passed to element 96 via path 98. Element 96 moves the nozzle at the transport velocity to a point inside an area to be filled on the surface of the substrate proximate to a boundary path to be traced. Control is then passed to element 100 via path 102. Element 100 lowers an end of the nozzle to the first deposition height. Control is then passed to element 104 via path 106. Element 104 moves the nozzle to a point on a first boundary path inside an area to be filled on the surface of the substrate and stabilizes a first velocity and first ink delivery rate such that ink droplet 20 is stabilized on the end of nozzle 12. A contact region 30 of ink droplet 20 contacts surface 24 of substrate 18 where contact region 30 of ink droplet 20 on surface 24 of substrate 18 defines a first effective pen radius. The pen radius is equal to one half of the width of the contact region 30 of ink droplet 20 on surface 24 of substrate 18 in a direction perpendicular to the nozzle direction and parallel to the surface 24 of substrate 18, the nozzle direction being a direction of movement of nozzle 12 parallel to the surface 24 of substrate 18. The first ink delivery rate, first deposition height and first nozzle velocity being low enough to stabilize a droplet capable of accurately depositing an outline of the area to be filled. Control is then passed to element 108 via control path 110. Element 108 moves nozzle 12 at the first nozzle velocity and with the first ink delivery rate in the direction parallel to surface 24 of substrate 18 to trace the first boundary path with a stabilized ink droplet with first effective pen radius until just before the first boundary path is retraced. Control is then passed to element 112 via path 114. If the condition that more boundary paths exist is satisfied, control is passed to element 92 via path 115. If the condition that more boundary paths exist is not satisfied, control is passed to element 116 via path 118. Element 116 positions an end 22 of nozzle 12 at a second deposition height. Control is then passed to element 120 via path 122. Element 120 moves nozzle 12 to a proximate point on next adjacent internal path within the area to be filled on the surface 24 of the substrate 18 stabilizing a second velocity and second ink delivery rate such that ink droplet 20 is stabilized on end 22 of nozzle 12, a contact region of the ink droplet contacts the surface of the substrate, the contact region 30 of ink droplet 20 on surface 24 of substrate 18 defining a second effective pen radius, greater than the first effective pen radius. The second ink delivery rate, second deposition height and second nozzle velocity each are greater than the first ink delivery rate, first deposition height and first nozzle velocity used to create the first effective pen radius and each high enough to stabilize a droplet capable of rapidly filling in the interior of the outline to be filled. Control is then passed to element 124 via path 126. Element 124 moves nozzle 12 with second effective pen radius in the nozzle direction parallel to surface 24 of substrate 18 to trace the internal path defining a closed loop such that the internal path is set back from adjacent contact regions with proposed ink deposition by a distance equal to a second effective pen radius minus an overlap. Control is then passed to element 128 via path 130. If the condition that a point on an adjacent internal path that has not had any portion traced becomes proximate to the nozzle is satisfied, then control is passed to element 120 via path 131. If the condition that a point on an adjacent internal path that has not had any portion traced becomes proximate to the nozzle is not satisfied, then control is passed to element 132 via path 134. Element 132 moves the nozzle with second effective pen radius in the nozzle direction parallel to surface 24 of substrate 18 to trace the internal path until just before the internal path is retraced. Control is then passed to element 136 via path 138. If the condition that a partially traced adjacent path exists is satisfied, then control is passed to element 140 via path 142. Element 140 moves nozzle 12 to the first proximate untraced point on the untraced path. Control is then passed to element 120 via path 143. If the condition that a partially traced adjacent path exists is not satisfied, then control is passed to element 144 via path 146. If the condition that the outline to be filled is completely filled is not satisfied, then control is passed to element 148 via path 150. Element 148 lifts the nozzle to the transport height while simultaneously moving the nozzle to a proximate point inside an untraced path. Control is then passed to element 116 via path 151. If the condition that the outline to be filled is completely filled is satisfied, then control is passed to element 152 via path 154. Element 152 lifts the nozzle from the deposition height to the transport height while simultaneously moving the nozzle at the transport velocity to a next area to be filled. Control is then passed to element 156 via path 158, where the method is exited.

Having thus described the preferred embodiments of the present invention, those of skill in the art will readily appreciate that yet other embodiments may be made and used within the scope of the claims hereto attached.

I claim:

1. A method for generating three-dimensional ink decoration on a substrate, comprising the steps of:

a. forming an ink droplet between an end of a nozzle and a surface of said substrate; and b. controlling a wetting of said ink droplet on said surface of said substrate to effect a controlled exchange of ink from said nozzle to said substrate to maintain an accurate deposition of said ink on said substrate by maintaining said contact angle of said ink droplet to be less than 180° by controlling said delivery rate of said ink through said nozzle in combination with an ink deposition height of said nozzle above said surface of said substrate and a nozzle velocity in a direction parallel to said surface of said substrate.

2. A method for generating three-dimensional ink decoration on a substrate, comprising the steps of:

a. providing a dispensing nozzle for deposition of ink on said substrate;

b. positioning an end of said nozzle at a transport height above said substrate to prevent ink accumulated at said end of said nozzle from being deposited on said substrate as said nozzle is moved across a surface of said substrate;

c. forming an ink droplet at said end of said nozzle;

d. moving said nozzle to a point inside an area to be filled on said surface of said substrate;

e. lowering said end of said nozzle to a deposition height so that a contact region of said ink droplet contacts said surface of said substrate, said contact region defining an effective pen radius, said effective pen radius being equal to one half of a width of said contact region of said ink droplet on said surface of said substrate in a direction perpendicular to a nozzle direction and parallel to said surface of said substrate, said nozzle direction being a direction of movement of said nozzle parallel to said surface of said substrate;

f. delivering said ink through said nozzle onto said substrate at a delivery rate;

g. controlling a nozzle velocity and said nozzle direction to define said contact region of said ink droplet on said surface of said substrate within said area being filled;

h. filling said area;

i. lifting said nozzle from said deposition height to said transport height once said area is filled;

j. moving said nozzle to a next area to be filled; and k. repeating steps (e)–(j) until all areas on said substrate are filled.

3. A method for generating three-dimensional ink decoration on a substrate, comprising the steps of:

a. providing a dispensing nozzle for delivery of ink at a delivery rate to an ink droplet, said ink droplet being in contact with a surface of said substrate;

b. calculating an outline of an area to be filled;

c. calculating a number of boundary paths of said area to be filled, each said boundary path being spaced from said outline by a first effective pen radius, said first effective pen radius being equal to one half of a width of a contact region of said ink droplet on said surface of said substrate in a direction perpendicular to a nozzle direction and parallel to said surface when said ink is being delivered to said ink droplet at a first delivery rate and said nozzle is moving in said nozzle direction at a first velocity, said nozzle direction being a direction of movement of said nozzle parallel to said surface of said substrate;

d. calculating a number of interior paths of said outline to fill said outline, each one of said number of interior paths which is adjacent to one or more of said number of boundary paths being spaced from said one or more of said number of said boundary paths by a sum of said first effective pen radius and a second effective pen radius minus an overlap of said first effective pen radius and said second effective pen radius, said second effective pen radius being equal to one half of said width of said contact region of said ink droplet on said surface of said substrate in said direction perpendicular to said nozzle direction and parallel to said surface of said substrate when said ink is being delivered to said ink droplet at a second delivery rate and said nozzle is moving in said nozzle direction at a second velocity, each said one of said number of interior paths spaced from adjacent ones of said number of interior paths by twice said second effective pen radius minus said overlap;

e. positioning an end of said nozzle at a transport height above said substrate to prevent said ink from being deposited on said substrate as said nozzle is moved at a transport velocity across said surface of said substrate, said transport velocity being greater than said first velocity and said second velocity;

f. moving said nozzle at said transport velocity to a point adjacent a one of said number of boundary paths;

g. lowering an end of said nozzle to said first deposition height;

h. providing said ink at said first delivery rate so that said ink droplet forms at said end of said nozzle and contacts said surface of said substrate, said contact region of said ink droplet on said surface of said substrate defining said first effective pen radius;

i. moving said nozzle at said first nozzle velocity to said one of said number of boundary paths, said ink being provided at said first ink delivery rate while said nozzle is at said first deposition height and moving at said first nozzle velocity stabilizing said ink droplet on said surface of said substrate at said first effective pen radius before said one of said number of boundary paths is reached to provide for an accurate and uniform deposition of said ink on said substrate;

j. moving said nozzle at said first nozzle velocity to trace said one of said number of boundary paths;

k. going to step m if all of said number of boundary paths have been traced;

l. going to step e to trace a next one of said number of boundary paths;

m. positioning said end of said nozzle at said second deposition height;

n. providing said ink at said second delivery rate;

o. moving said nozzle to a proximate point on an adjacent one of said number of internal paths at a second nozzle velocity, said ink droplet being stabilized at said second effective pen radius to provide for an accurate and uniform deposition of said ink on said substrate;

p. moving said nozzle at said second nozzle velocity to begin tracing said adjacent one of said number of internal paths;

q. going to step o if a point on a next adjacent one of said number of internal paths that has not had any portion traced is proximate to said nozzle;

r. moving said nozzle at said second nozzle velocity to trace said adjacent one of said number of internal paths until just before said adjacent one of said number of internal paths is retraced;

s. going to step v if a partially traced adjacent one of said number of internal paths does not exist;

t. moving to a closest proximate untraced point on said partially traced adjacent one of said number of internal paths;

u. going to step o;

v. going to step y if all of said number of internal paths have been completely traced;

w. lifting said nozzle to said transport height while simultaneously moving said nozzle at said transport velocity to a proximate point inside a next untraced one of said number of internal paths;

x. going to step m; and y. lifting said nozzle to said transport height while simultaneously moving said nozzle at said transport velocity to a next area to be filled.

4. The method of claim 3 wherein said second ink delivery rate is greater than said first ink delivery rate, said second deposition height is greater than said first deposition height, said second nozzle velocity is greater than said first nozzle velocity, and said second pen radius is greater than said first pen radius.

5. The method of claim 3 wherein one or more of said number of internal paths defines a closed loop, said one or more of said number of internal paths being traced until just before said nozzle reaches said proximate point where said internal path would be retraced.

6. The method of claim 3 wherein said one of said number of boundary paths is an external boundary path and said next one of said number of boundary paths is an internal boundary path.

7. The method of claim 3 wherein said outline is continuous around said area to be filled.

8. An apparatus for generating three-dimensional ink decoration on a substrate, comprising:

a. a nozzle to form an ink droplet between an end of said nozzle and a surface of said substrate; and b. a controller coupled to said nozzle to control a wetting of said ink droplet on said surface of said substrate to effect a controlled exchange of ink from said nozzle to said substrate to maintain an accurate deposition of said ink on said substrate by maintaining said contact angle of said ink droplet to be less than 180° by controlling said delivery rate of said ink through said nozzle in combination with an ink deposition height of said nozzle above said surface of said substrate and a nozzle velocity in a direction parallel to said surface of said substrate.

9. Apparatus for generating three-dimensional ink decoration on a substrate, comprising:

a. a dispensing nozzle for delivery of ink;

b. control means coupled to said nozzle to control a nozzle velocity and a nozzle direction of said nozzle, said nozzle direction being parallel to said surface of said substrate, said control means controlling a delivery rate of said ink through said nozzle and an ink deposition height of said nozzle above said surface of said substrate; and c. an ink droplet formed between an end of said nozzle and said substrate having a contact angle with said surface of said substrate which is less than 180°, said control means controlling a wetting of said surface of said substrate by said ink by controlling said contact angle of said ink droplet to be less than 180° by controlling said delivery rate in combination with said deposition height and said nozzle velocity.

10. An apparatus according to claim 9 wherein said contact angle is greater than 0° and less than 180°.

11. An apparatus according to claim 10 wherein said contact angle is 90°.

12. An apparatus according to claim 9 wherein said control means comprises:

a. a controllable pump; and b. a flexible tube coupling said pump to said nozzle, said pump in fluid communication with said nozzle and delivering a continuous flow of said ink to said nozzle to control said delivery rate of said ink through said nozzle.

13. An apparatus according to claim 12 wherein said ink is a highly loaded slurry.

14. An apparatus according to claim 13 wherein said pump is a positive displacement pump.

15. An apparatus according to claim 13 wherein said pump is a stepper motor controlled 10 ml syringe pump.

16. An apparatus according to claim 12 wherein said pump provides said ink to said nozzle at a pressure less than 400 psi.

17. An apparatus according to claim 9 wherein said nozzle has an inner diameter greater than five times larger than said largest dimension of any solid particle in said ink.

18. An apparatus according to claim 17 wherein said nozzle is a tube having an inner diameter within a range of 0.01 inches to 1.0 inches.

19. An apparatus according to claim 18 wherein said deposition height is equal to half of said diameter of said tube.

20. An apparatus according to claim 16 wherein said tube has a wall thickness within a range of 0.005 inches to 0.125 inches.

21. An apparatus according to claim 18 wherein said end of said nozzle is flat and parallel to said surface of said substrate.

22. An apparatus according to claim 21 wherein said deposition height is equal to half of a diameter of said nozzle.

23. An apparatus according to claim 9 wherein said nozzle has one or more protrusions for supporting said end of said nozzle on said substrate at said deposition height.

24. An apparatus according to claim 23 wherein said one or more protrusions are a centered 45° chisel point, said chisel point having two points to support said nozzle on said substrate while delivering said ink onto said substrate.

25. An apparatus according to claim 9 wherein said control means is a plotter, said plotter accepting commands to control said delivery rate of said ink through said nozzle and position said end of said nozzle at said deposition height above said substrate and control said nozzle velocity and said nozzle direction.

26. An apparatus according to claim 25 wherein said commands are software commands, said plotter being software controlled.

* * * * *